(12) United States Patent
Wang et al.

(10) Patent No.: US 8,313,018 B2
(45) Date of Patent: Nov. 20, 2012

(54) MOBILE TICKET VIRTUAL SENSOR FOR CONTEXT DETECTION

(75) Inventors: Shu Wang, Richardson, TX (US); Fan Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 12/913,181

(22) Filed: Oct. 27, 2010

(65) Prior Publication Data

US 2012/0104084 A1  May 3, 2012

(51) Int. Cl.
| | |
|---|---|
| *G06K 7/10* | (2006.01) |
| *G06K 19/00* | (2006.01) |
| *G06K 7/14* | (2006.01) |
| *G06K 5/00* | (2006.01) |
| *G06F 17/00* | (2006.01) |
| *G06Q 20/00* | (2006.01) |

(52) U.S. Cl. ............... 235/375; 235/462.01; 235/487; 235/454; 235/382; 705/64; 705/75

(58) Field of Classification Search .............. 235/375, 235/462.01, 487, 454, 382; 705/64, 75
See application file for complete search history.

(56) References Cited

U.S. PATENT DOCUMENTS

| | | | | |
|---|---|---|---|---|
| 4,251,798 A | * | 2/1981 | Swartz et al. | 235/462.2 |
| 5,581,071 A | * | 12/1996 | Chen et al. | 235/462.06 |
| 6,736,322 B2 | * | 5/2004 | Gobburu et al. | 235/462.46 |
| 6,969,002 B2 | * | 11/2005 | Creamer et al. | 235/462.15 |
| 7,262,685 B2 | * | 8/2007 | Bastian, II | 340/5.92 |
| 2002/0023027 A1 | * | 2/2002 | Simonds | 705/26 |
| 2002/0040308 A1 | * | 4/2002 | Hasegawa et al. | 705/5 |
| 2002/0091569 A1 | * | 7/2002 | Kitaura et al. | 705/14 |
| 2003/0024990 A1 | * | 2/2003 | Wilz et al. | 235/462.45 |
| 2003/0065784 A1 | * | 4/2003 | Herrod | 709/227 |
| 2004/0039635 A1 | * | 2/2004 | Linde et al. | 705/14 |
| 2004/0118923 A1 | * | 6/2004 | Creamer et al. | 235/462.01 |
| 2004/0155990 A1 | * | 8/2004 | Leoniak | 349/6 |
| 2005/0140498 A1 | * | 6/2005 | Bastian | 340/5.92 |
| 2005/0258252 A1 | * | 11/2005 | Winter et al. | 235/472.02 |
| 2005/0284933 A1 | * | 12/2005 | McGill | 235/383 |
| 2006/0081704 A1 | * | 4/2006 | Boyd | 235/382 |
| 2006/0243806 A1 | * | 11/2006 | Goodman et al. | 235/462.13 |
| 2007/0109262 A1 | * | 5/2007 | Oshima et al. | 345/156 |
| 2008/0087727 A1 | * | 4/2008 | Jenney et al. | 235/385 |
| 2008/0176543 A1 | * | 7/2008 | Gravel et al. | 455/414.2 |
| 2009/0325640 A1 | * | 12/2009 | Chava | 455/556.1 |
| 2010/0133339 A1 | * | 6/2010 | Gibson et al. | 235/382 |
| 2010/0312694 A1 | * | 12/2010 | Homeier-Beals | 705/39 |
| 2011/0207531 A1 | * | 8/2011 | Gagner et al. | 463/30 |
| 2011/0215162 A1 | * | 9/2011 | Challa et al. | 235/494 |
| 2012/0029994 A1 | * | 2/2012 | Barkan et al. | 705/14.25 |
| 2012/0061462 A1 | * | 3/2012 | Shadwell et al. | 235/375 |
| 2012/0067944 A1 | * | 3/2012 | Ross | 235/375 |

FOREIGN PATENT DOCUMENTS

| | | |
|---|---|---|
| KR | 10-2008-0052158 A | 6/2008 |
| KR | 10-2008-0058172 A | 6/2008 |

* cited by examiner

*Primary Examiner* — Daniel Walsh
(74) *Attorney, Agent, or Firm* — Jefferson IP Law, LLP

(57) ABSTRACT

An apparatus and method for are provided. The method includes determining that a barcode displayed on a mobile terminal has been scanned, retrieving metadata corresponding to the barcode when the barcode has been scanned, and triggering a context-aware action in the mobile terminal based on the barcode and/or the retrieved metadata.

13 Claims, 4 Drawing Sheets

| Mobile Boarding Pass |

PLATINUM PriorityAAccess

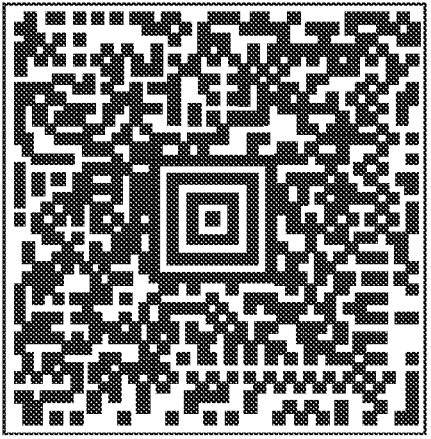

| Save Boarding Pass |

| PASSENGER NAME |
| TESTFEND0EXECPLAT |
| FLIGHT/DATE |
| AA2313/17 Oct |
| SEAT |
| 14A |
| BOARDING TIME |
| 06:40 AM |
| DEPARTURE TIME |
| 09:15 AM |
| FROM: |
| Chicago, ORD |
| TO: |
| Dallas/ Fort W. DFW |
| GATE: |
| 14A |
| PNR RECORD LOCATOR |
| JGOQPL |

At the airport, using your cell phone or mobile device show this boarding pass:

- at a Bag Drop position or Self Service Machine if you are checking baggage
- at the security checkpoint to the TSA
- at your gate during boarding

FIG. 1
RELATED ART

MOBILE TICKET VIRTUAL SENSOR FOR CONTEXT DETECTION

BACKGROUND OF THE INVENTION

1. Field of the Invention

The present invention relates to an apparatus and method for barcodes and mobile devices. More particularly, the present invention relates to an apparatus and method for triggering content sensitive awareness upon scanning a barcode.

2. Description of the Related Art

Mobile terminals were developed to provide wireless communication between users. As technology has advanced, mobile terminals now provide many additional features beyond simple telephone conversation. For example, mobile terminals are now able to provide additional functions, such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

A mobile ticket is one feature that can be implemented by modern mobile terminals. In a mobile ticket, a mobile terminal receives a barcode. When the barcode is displayed on the mobile terminal, the barcode can be read by a barcode scanner. This enables the mobile terminal to function as a ticket or pass, eliminating the need to issue a paper ticket. A mobile ticket provides many advantages over a paper ticket. For example, a mobile ticket does not need to be printed out, thus saving paper and ink. Moreover, because the ticket is issued to a mobile terminal instead of issued as a paper ticket, the ticket is much less likely to be lost, stolen, or forgotten.

FIG. 1 illustrates an example of a mobile ticket according to the related art.

Referring to FIG. 1, a mobile airline ticket includes a barcode to be scanned. The mobile ticket may also display other information to the user or the employee scanning the barcode. For example, the mobile ticket shown in FIG. 1 includes departure times, seat information, departure gates, and the like. This information may be encoded as metadata associated with the barcode, and the mobile ticket may comprise both the barcode and the associated metadata. The mobile ticket may also be encrypted for greater security.

The barcode shown in FIG. 1 is scanned by a barcode reader to process the ticket. Barcode readers include pen type barcode readers, laser scanners, CCD readers, and imaging scanners. Laser scanners and pen type readers are equipped with a light source and a photodiode. The light source focuses light of a predetermined frequency onto the bar code. The reflected light is detected by the photodiode, and the barcode is scanned based on the reflected light. The light source employed by laser scanners and pen type readers is tuned to a specific frequency, and thus the photodiode is sensitive only to light of those specific frequencies. Presently, however, mobile terminals currently do not utilize this light information to detect the scanning activity of mobile tickets.

Some applications can provide context-sensitive functions based on a mobile ticket. For example, when attending a concert, a mobile terminal should be switched off or to a vibrate mode so that enjoyment of the concert is not interrupted by the mobile terminal ringing. When the mobile terminal receives the concert ticket, the application can extract the concert date and time from the ticket using the associated metadata and schedule the mobile terminal to enter into a vibrate mode when the concert begins, based on the metadata contained in the ticket. However, this method does not take into account the possibility that the concert may be rescheduled or postponed, or that the user may not attend the concert. In such situations, the user must manually update the application so that the mobile terminal does not enter into the vibration mode at the wrong time. Accordingly, there is a need for an apparatus and method for providing improved context sensitive awareness for mobile tickets.

SUMMARY OF THE INVENTION

An aspect of the present invention is to address at least the above-mentioned problems and/or disadvantages and to provide at least the advantages described below. Accordingly, an aspect of the present invention is to provide an apparatus and method for enhanced context-awareness when scanning a barcode.

In accordance with an aspect of the present invention, a method for providing context-aware functions in response to scanning a barcode is provided. The method includes determining that a barcode displayed on a mobile terminal has been scanned, retrieving metadata corresponding to the barcode when the barcode has been scanned, and triggering a context-aware action in the mobile terminal based on the barcode and/or the retrieved metadata.

In accordance with another aspect of the present invention, a mobile terminal is provided. The mobile terminal includes a communication unit for receiving a barcode; a display unit for displaying the barcode, a mobile ticket virtual sensor for determining whether the barcode has been scanned while the display unit is displaying the barcode, and a context-aware engine for performing a predetermined action when the barcode has been scanned.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 illustrates an example of a mobile ticket according to the related art;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal." However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Exemplary embodiments of the present invention provide a mobile terminal capable of detecting scanning activity of a barcode scanner, which permits the mobile terminal to infer the user's activity based on the scanning activity and context information contained in a mobile ticket. As a result, the mobile terminal becomes a context aware and intelligent phone which knows the user's location and performs appropriate actions based on that information. The mobile terminal thus provides more accurate context information.

Figure 2:
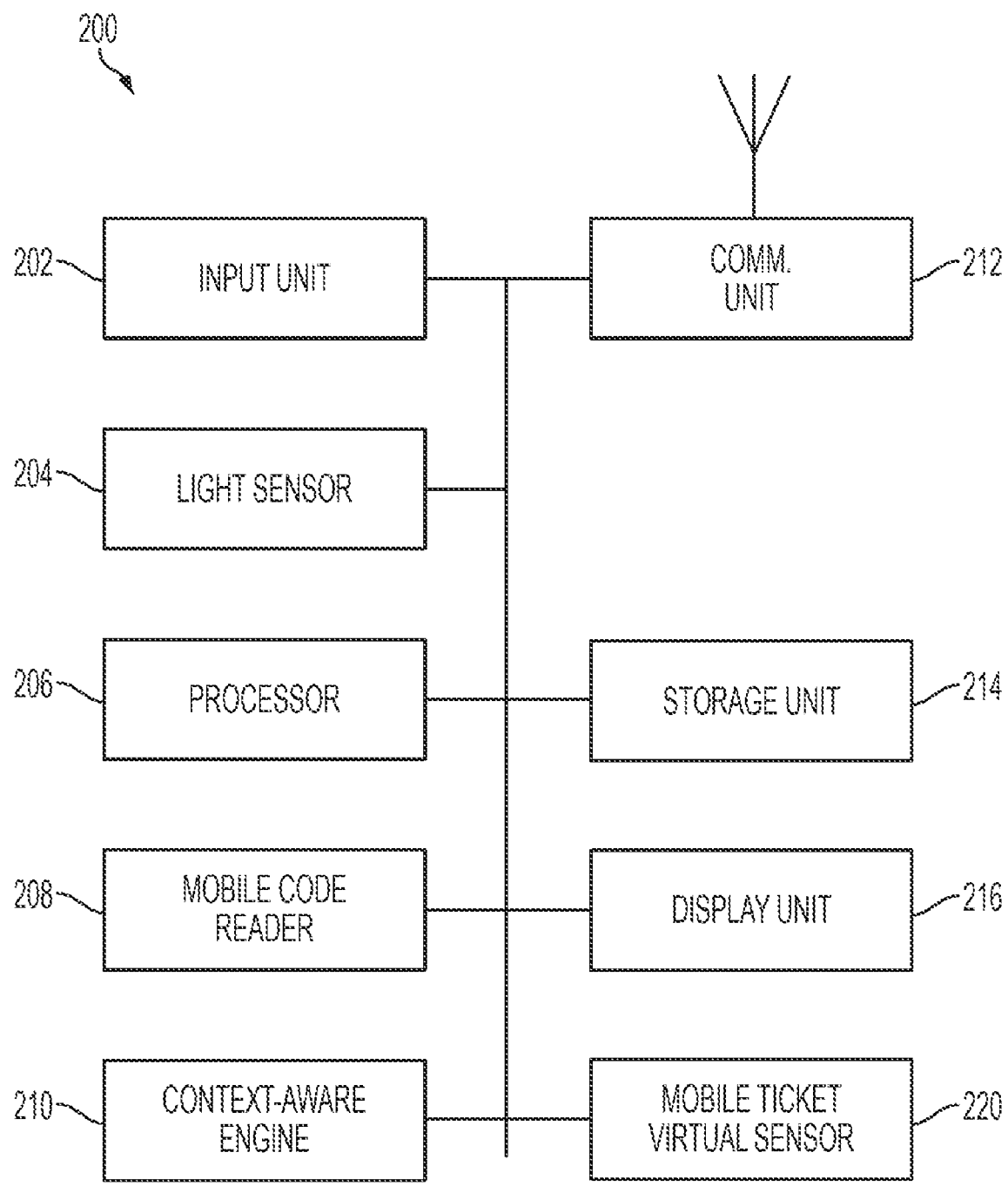
FIG. 2 illustrates a mobile terminal according to an exemplary embodiment of the present invention.

FIG. 2 illustrates a mobile terminal according to an exemplary embodiment of the present invention.

Referring to FIG. 2, the mobile terminal 200 includes an input unit 202, a mobile ticket virtual sensor 204, a processor 206, a mobile code reader 208, a context-aware engine 210, a communication unit 212, a storage unit 214, and a display unit 216. The mobile terminal 200 may also include additional or different units not illustrated. Similarly, the functionality of two or more of the above units may be integrated into a single device.

The communication unit 212 performs communication functions of the mobile terminal. According to exemplary embodiments of the present invention, the communication unit 212 receives a mobile ticket from an outside source. For example, in the case of an airline ticket, the communication unit 212 may receive the mobile ticket from an airline or travel service. The mobile code reader 208 extracts information from the mobile ticket. The mobile ticket and the extracted information are stored in the storage unit 214. When the mobile ticket is ready to be presented, the user inputs a command via the input unit 202 requesting the display of the mobile ticket. Upon receiving the request, the processor 206 controls the display unit 216 to display the mobile ticket.

In the case of an airline ticket such as the ticket illustrated in FIG. 1, the user may input a command to display the mobile ticket at the check-in counter or the departure gate. An airline employee would then scan the ticket as part of the check-in process. When the airline employee employs a pen type or laser scanner, the scanning device will focus a light of a known frequency onto the mobile terminal in order to scan the barcode.

When the mobile ticket is scanned by a pen type or laser scanner, the light sensor 204 detects the light focused on the mobile terminal. The light sensor 204 may be a photodiode or other sensor designed to sense light of predetermined frequencies corresponding to those used by pen type or laser scanners. The mobile ticket virtual sensor 220 determines whether the mobile ticket is being scanned based on the light sensed by the light sensor 204. When the mobile ticket virtual sensor 220 determines that the mobile ticket has been scanned, the mobile ticket virtual sensor 220 alerts the context-aware engine 210. The context-aware engine 210 then performs actions based on the extracted information stored in the storage unit 214. The relationship between the light sensor 204, mobile ticket virtual sensor 220, mobile code reader 208, and mobile ticket virtual sensor 220 is described below in more detail with respect to FIG. 3.

Figure 3:
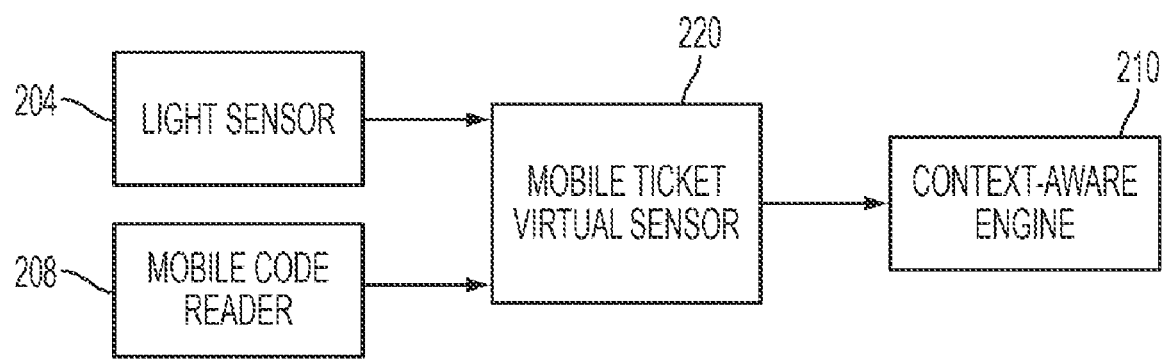
FIG. 3 illustrates a mobile ticket system according to exemplary embodiments of the present invention.

FIG. 3 illustrates a mobile ticket system according to an exemplary embodiment of the present invention.

Referring to FIG. 3, the mobile ticket system includes the light sensor 204, the mobile ticket virtual sensor 220, the mobile code reader 208, and the context-aware engine 210 shown in FIG. 2. As discussed above, the light sensor 204 detects the optical light transmitted by a pen type or laser scanner. The light sensor 204 passes the detected light intensity values and other parameters to the mobile ticket virtual sensor 220.

The mobile code reader 208 provides the mobile ticket for scanning and manages the context metadata of mobile tickets. The mobile ticket is usually delivered to the mobile terminal as a mobile ticket message by a messaging system, such as Short Message Service (SMS), Enhanced Messaging Service (EMS), Wireless Application Protocol (WAP) Push, and Multimedia Messaging Service (MMS). The mobile ticket message generally includes metadata about the mobile ticket, which may be extracted by the mobile code reader 208.

Mobile tickets are currently undergoing a standardization process, and the mobile code reader 208 can be designed to extract metadata from the mobile ticket according to the defined standard. However, metadata extraction is not limited to information contained in the mobile ticket message. For example, if the mobile ticket hides metadata via steganography, the mobile code reader may extract the ticket context metadata from the steganography based mobile ticket. In addition, other types of information could be obtained from the mobile ticket or from analysis of the barcode itself.

The mobile ticket virtual sensor 220 may be a soft sensor implemented as a software component in which multiple measurements, including information from the light sensor 204, is combined to determine whether the mobile ticket has been scanned. The mobile ticket virtual sensor 220 receives the light intensity and other information from the light sensor 204 and determines whether a mobile ticket is being scanned. If the light intensity is greater than a predetermined threshold and a mobile ticket is being displayed on the display unit 216, then the mobile ticket virtual sensor 220 concludes that the mobile ticket is being scanned. Since pen type scanners utilize different light sources and intensities than laser scanners, the mobile ticket virtual sensor 220 may compare the received light intensity values and other information with different thresholds according to the type of light received. For example, if the mobile terminal receives information from the light sensor 204 indicating that the light sensor 204 is detecting light consistent with a pen type reader, the mobile ticket virtual sensor 220 compares the received light intensity values with a threshold corresponding to the pen type reader in order to determine whether the mobile ticket is being scanned.

When the mobile ticket virtual sensor 220 determines that the mobile ticket has been scanned, the mobile ticket virtual sensor 220 transmits the metadata information to the context aware engine 210. The mobile ticket virtual sensor 220 identifies the mobile ticket being displayed, obtains the metadata, and provides the metadata to the context aware engine 210. The mobile ticket virtual sensor 220 may obtain the metadata directly from the storage unit 214 or may request the metadata from the mobile code reader 208.

The context-aware engine 210 triggers context-aware applications and functions of the mobile terminal based on the metadata extracted from the mobile ticket message. In addition, the context-aware engine 210 may also make use of other information, such as state information of the mobile terminal or information about the environment in which the mobile terminal is located. Accordingly, the particular action performed may depend solely upon the metadata, solely upon other information, or on both the metadata and the other information.

For example, with respect to the airline ticket shown in FIG. 1, when the mobile ticket virtual sensor 220 determines that the airline ticket has been scanned, the mobile ticket virtual sensor 220 passes the metadata related to the airline ticket to the context-aware engine 210. The context-aware engine 210 determines that the mobile ticket is an airline ticket, and automatically causes the mobile terminal 200 to enter into an airplane mode in which the mobile communication functions of the mobile terminal 200 are disabled. The context-aware engine 210 may also use GPS location information of the mobile terminal 200 to further confirm that the user is at an airport prior to triggering the airport mode. Alternatively, the context-aware engine 210 may display a prompt to the user requesting whether the mobile terminal 200 should be placed into the airplane mode for air travel.

In another example, the mobile ticket may be a mobile concert ticket. In this case, when the mobile ticket virtual sensor 220 determines that the mobile concert ticket has been scanned, the mobile ticket virtual sensor 220 passes the metadata related to the mobile concert ticket to the context-aware engine 210. The metadata may include information about the performers, the venue, and/or the content of the performance.

The context-aware engine 210 may, in turn, perform specific actions related to the mobile concert ticket. The specific actions may be related to concert tickets in general or the specific concert ticket scanned. The context-aware engine 210 may cause the mobile terminal 200 to enter into a vibrate mode in which audio alerts are turned off. In addition, the context-aware engine 210 may execute an application in the mobile terminal 200 to provide information about the concert, including information about the performers, the venue, or the content. If the metadata includes a link to further information, the context-aware engine 210 may also cause a web browser to navigate to the link included in the metadata. If the metadata indicates that the venue provides a wireless communication services (such as Wi-Fi), and the context-aware engine 210 determines that the wireless communication service would be more effective than the communication method currently used by the mobile terminal 200, the context-aware engine 210 may display a dialog to determine whether the user would like to switch to the wireless communication service provided by the venue.

Figure 4:
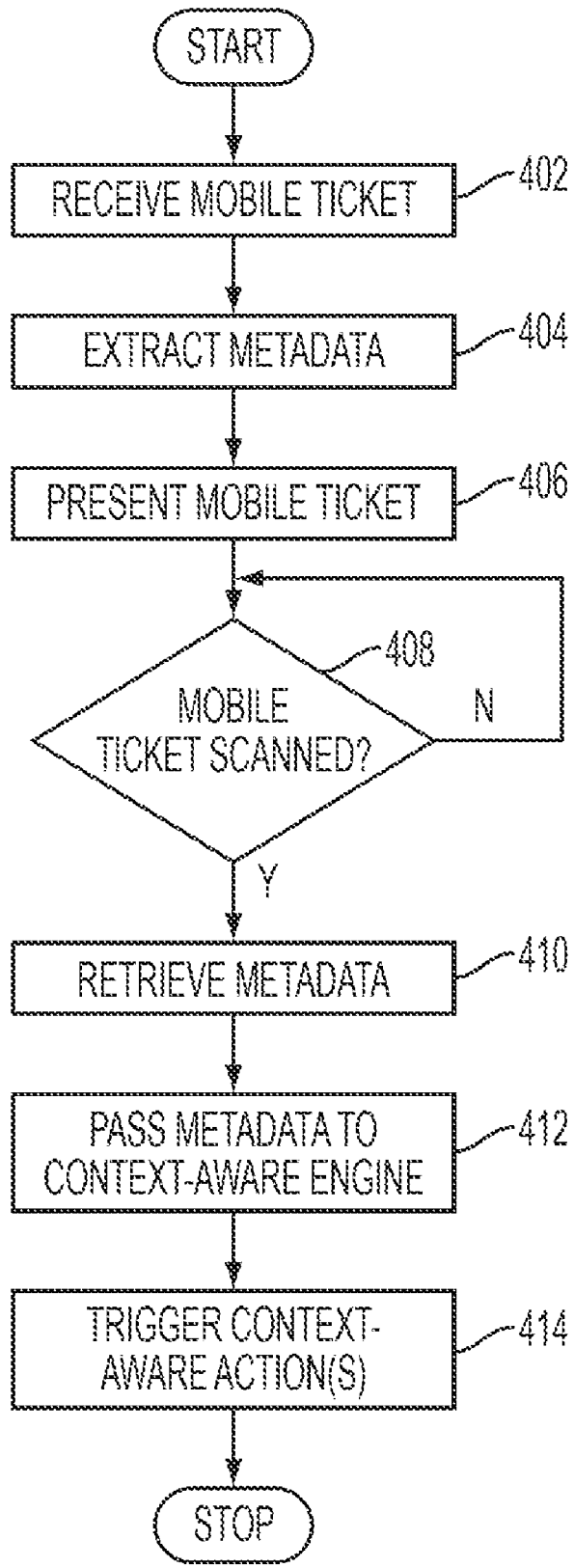
FIG. 4 illustrates a method of providing context-aware services in conjunction with scanning a mobile ticket, according to an exemplary embodiment of the present invention.

FIG. 4 illustrates a method of providing context-aware services in conjunction with scanning a mobile ticket, according to an exemplary embodiment of the present invention.

Referring to FIG. 4, the mobile terminal 200 receives the mobile ticket in step 402. The mobile ticket may be received in response to a request or purchase from a user, or in any other fashion. In step 404, the mobile code reader 208 extracts metadata from the mobile ticket. The metadata may, for example, be stored in a standard format, although no particular format of the metadata is required.

In step 406, the user presents the mobile ticket to be scanned. In presenting the mobile ticket, the mobile terminal 200 displays the mobile ticket on the display unit 216 so that a bar code reader may scan the barcode. The display unit 216 may display other information, related to the mobile ticket or not, in addition to the barcode. The particular mechanism by which the user presents the mobile ticket is not a limiting aspect of the present invention, and various mechanisms would be apparent to a person of ordinary skill in the art. For example, to present the mobile ticket, the user may display the message containing the mobile ticket on the display unit 216, or may execute another application to display the mobile ticket.

In step 408, the mobile ticket virtual sensor 220 is activated after a mobile ticket is displayed. The mobile ticket virtual sensor 220 determines whether the mobile ticket has been scanned based on light information received from the light sensor 204. If the mobile ticket virtual sensor 220 determines that the mobile ticket has not been scanned, the mobile ticket virtual sensor 220 waits until the mobile ticket has been scanned. Although not shown in FIG. 4, according to exemplary embodiments of the present invention, the method may terminate early if the mobile ticket virtual sensor 220 determines that the mobile ticket has not been scanned after a predetermined time or when a predetermined event occurs. The predetermined event may be, for example, when the mobile ticket is no longer displayed on the display unit 216 and the mobile ticket has not yet been scanned.

The mobile ticket virtual sensor 220 employs the light sensor 204 to determine whether the mobile ticket has been scanned. The mobile ticket virtual sensor 220 may activate the light sensor 204 after the mobile ticket is presented in step 406. The mobile ticket virtual sensor 220 may disregard light information received from the light sensor 204 until after the mobile ticket has been presented.

In step 410, the mobile ticket virtual sensor 220 requests metadata corresponding to the scanned mobile ticket from the mobile code reader 208. In requesting the metadata, the mobile ticket virtual sensor 220 may transmit identifying information to the mobile code reader 208 to identify the mobile ticket being scanned. The mobile code reader 208 retrieves the metadata from the storage unit 214 and transmits the metadata to the mobile ticket virtual sensor 220. Alternatively, the mobile ticket virtual sensor 220 may obtain the metadata directly, without requesting the metadata from the mobile code reader 208. Once the mobile ticket virtual sensor has obtained the metadata, the mobile ticket virtual sensor 220 passes the metadata to the context-aware engine 210 in step 412.

In step 414, the context-aware engine 210 analyses the metadata and triggers specific functions or applications of the mobile terminal based on the analysis. The metadata itself may specify actions to be taken by the context-aware engine 210. The context-aware engine 210 may then perform the specified actions as a result of the analysis. Where the metadata does not specify any actions to be taken, the context-aware engine 210 may use the context information inferred from the mobile ticket and combine the context information with the context aware engine 210's rules and logics to trigger context based actions. For example, if the context-aware engine 210 determines that the mobile ticket is an airline ticket, the context-aware engine 210 may control the mobile terminal 200 to enter into the airplane mode. According to an exemplary embodiment of the present invention, the context-aware engine 210 may include a database of actions associated with different contexts, which the context-aware engine 210 may consult to determine an appropriate action in response to receiving the metadata. The user may also specify particular actions or applications to launch in response to certain contexts.

Although exemplary embodiments of the present invention have been described above with respect to bar codes appearing on mobile tickets, the present invention is not limited thereto. Exemplary embodiments of the present invention may also be applied to bar codes scanned in other contexts as well.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing context-aware functions in response to scanning a barcode, the method comprising:
    receiving, at a mobile terminal, a message including the barcode and metadata corresponding to the barcode;
    extracting the metadata from the message;
    storing the metadata in a storage unit of the mobile terminal;
    determining, by the mobile terminal, that the barcode displayed on the mobile terminal has been scanned;
    retrieving the metadata from the storage unit when the barcode has been scanned; and
    automatically triggering a context-aware action in the mobile terminal based on at least one of information contained in the barcode obtained from the scanning and the retrieved metadata,
    wherein the triggering of the context-aware function comprises executing an application stored in the mobile terminal.

2. The method of claim 1, wherein the triggering of the context-aware action comprises performing a function of the mobile terminal.

3. The method of claim 1, wherein the barcode is included in a mobile ticket.

4. The method of claim 1, wherein the determining that the barcode has been scanned comprises:
    receiving light intensity values corresponding to a light focused on the display unit of the mobile terminal; and
    determining that the barcode has been scanned based on the light intensity values and/or additional information.

5. The method of claim 1, wherein the determining based on the light intensity values comprises:
    determining that the barcode has been scanned when the light intensity value is greater than or equal to a predetermined threshold.

6. The method of claim 1, wherein the metadata includes at least one of information about a state of the mobile terminal and information about an environment and location of the mobile terminal.

7. A mobile terminal, comprising:
    a communication unit operable to receive a message including a barcode and metadata corresponding to the barcode;
    a display unit operable to display the barcode;
    a mobile code reader operable to extract the metadata from the message;
    a storage unit operable to store the barcode and the metadata;
    a mobile ticket virtual sensor operable to determine whether the barcode has been scanned while the display unit is displaying the barcode; and
    a context-aware engine operable to automatically perform a predetermined action when the barcode has been scanned, based on at least one of information contained in the barcode obtained from the scanning and the stored metadata,
    wherein the context-aware engine performs the predetermined action based on the stored metadata, and
    wherein the predetermined action comprises executing an application of the mobile terminal.

8. The mobile terminal of claim 7, further comprising:
    a light sensor for sensing predetermined frequencies of light corresponding to frequencies employed by a barcode scanner,
    wherein the mobile ticket virtual sensor determines that the barcode has been scanned based on the sensed frequencies of light and additional information.

9. The mobile terminal of claim 8, wherein the mobile ticket virtual sensor determines that the barcode has been scanned when an intensity of the light sensed by the light sensor is greater than or equal to a predetermined threshold.

10. The mobile terminal of claim 7, wherein, when the mobile ticket virtual sensor determines that the barcode has been scanned, the mobile ticket virtual sensor obtains the metadata from the mobile code reader and provides the metadata to the context-aware engine.

11. The mobile terminal of claim 7, wherein the context-aware engine performs a function of the mobile terminal based on the metadata when the barcode has been scanned.

12. The mobile terminal of claim 7, wherein the context-aware engine executes an application stored in the mobile terminal based on the metadata when the barcode has been scanned.

13. The mobile terminal of claim 7, wherein the metadata includes at least one of information about a state of the mobile terminal and information about an environment and location of the mobile terminal.

* * * * *